(12) United States Patent
Ai et al.

(10) Patent No.: US 7,029,414 B2
(45) Date of Patent: Apr. 18, 2006

(54) HUB ASSEMBLY WITH SPEED CHANGE

(75) Inventors: Xiaolan Ai, Massillon, OH (US); Terry W. Mohr, Canton, OH (US)

(73) Assignee: The Timken Company, Canton, OH (US)

( * ) Notice: Subject to any disclaimer, the term of this patent is extended or adjusted under 35 U.S.C. 154(b) by 230 days.

(21) Appl. No.: 10/645,462

(22) Filed: Aug. 21, 2003

(65) Prior Publication Data

US 2004/0209724 A1 Oct. 21, 2004

Related U.S. Application Data

(63) Continuation-in-part of application No. 09/853,534, filed on May 11, 2001, now abandoned.

(51) Int. Cl.
*F16H 13/08* (2006.01)

(52) U.S. Cl. ........................ 475/197; 180/372

(58) Field of Classification Search ............... 475/183, 475/197; 180/372; 476/67, 68
See application file for complete search history.

(56) References Cited

U.S. PATENT DOCUMENTS

| 115,861 | A | * | 6/1871 | Jaquith ........................ 476/28 |
|---|---|---|---|---|
| 1,003,055 | A | | 9/1911 | Lockwood |
| 2,089,048 | A | | 8/1937 | Bachman |
| 3,048,058 | A | | 8/1962 | Chery |
| 3,207,004 | A | | 9/1965 | Chery |
| 3,889,554 | A | * | 6/1975 | Sinclair et al. ............. 475/197 |
| 4,330,045 | A | * | 5/1982 | Myers ........................ 180/65.5 |
| 4,930,590 | A | * | 6/1990 | Love et al. .................... 180/55 |
| 5,048,635 | A | | 9/1991 | Wakabayashi et al. |
| 5,688,201 | A | | 11/1997 | Zhou |
| 5,813,938 | A | | 9/1998 | Forster |
| 5,851,163 | A | | 12/1998 | Kawase et al. |
| 6,095,940 | A | | 8/2000 | Ai et al. |
| 6,406,399 | B1 | | 6/2002 | Ai |

FOREIGN PATENT DOCUMENTS

| JP | 54-10860 | * | 1/1979 | .................. 475/197 |
|---|---|---|---|---|
| JP | 54-39763 | * | 3/1979 | .................. 475/197 |
| JP | 6-94092 | * | 4/1994 | .................. 475/197 |

* cited by examiner

*Primary Examiner*—Ha Ho
(74) *Attorney, Agent, or Firm*—Polster, Lieder, Woodruff & Lucchesi, L.C.

(57) ABSTRACT

A hub assembly includes a carrier that is attached to a supporting structure, a shaft having a pair of sun rollers located in the carrier, a hub having a pair of rings, each surrounding a different sun roller, and planet rollers arranged in two rows between the sun rollers and the rings. The carrier has axles about which the planet rollers rotate. The planet rollers bear against each other at beveled end faces such the rollers on each axle back each other. Each roller contains an antifriction bearing which enables it to revolve on its axle and transfer radially and/or axially directed loads to the carrier. The planet roller axles are supported in the carrier such that wheel loads are transferred from the hub to the carrier and then to a supporting structure to which the carrier is mounted such that the wheel loads bypass a central shaft which extends through the hub and carrier.

37 Claims, 8 Drawing Sheets

HUB ASSEMBLY WITH SPEED CHANGE

CROSS-REFERENCE TO RELATED APPLICATIONS

This application is a continuation-in-part of application Ser. No. 09/853,534, filed May 11, 2001 (now abandoned), and which is incorporated herein by reference.

STATEMENT REGARDING FEDERALLY SPONSORED RESEARCH OR DEVELOPMENT

Not Applicable.

BACKGROUND OF THE INVENTION

This invention relates in general to hub assemblies and more particularly to a hub assembly which accommodates rotation about an axis with a change in angular velocity.

Some vehicles rely on electric motors to power their wheels, and these motors are typically located at the wheels themselves—one for each driven wheel. But the wheels often require torques of large magnitude to rotate them. To reduce the torque demands, the wheel assemblies often include speed-reducing devices, and they may take the form of planetary gear drives.

Such wheel assemblies are not altogether satisfactory. First they are complex, with some of the complexity residing in the co-existence of gear drives and antifriction bearings which transfer the weight of the vehicle chassis to the wheels. In this regard, the planetary gears do not have the capacity to transfer radial loads themselves. Moreover, gear drives generate noise and consume energy inasmuch as the teeth of the gears, where they mesh, slide over each other. Also gear drives require oil lubrication, which is difficult to provide at the remote locations of the wheels.

In my prior U.S. Pat. No. 6,095,940, which is incorporated herein by reference, I disclosed a traction drive transmission. That traction drive included a two piece shaft surrounded by a two piece ring segment, each of which have a tapered raceway. A roller is positioned between the shafts and the ring segments and rotates about an axle which is supported by a roller carrier. The rollers frictionally engage the tapered raceways of the ring segment and shaft segments. Thus, when the shaft is rotated, rotational energy is transmitted to the rollers and hence to the ring segments and roller carrier. The traction drive described in the U.S. Pat. No. 6,095,940 patent transmits outwardly directed forces adequately to rotate the wheel. However, the construction of this drive does not enable the assembly to bear external loads from wheels. When the ring is mounted to a wheel, loads from the wheels are transmitted from the wheel to the ring and to the roller and then to the roller axle. The roller axle can move radially relative to the shaft. Thus, when the wheel exerts a radially inwardly directed force to the roller axle, the roller axle will move radially inwardly, allowing the roller to more forcefully engage the shaft. Hence, the radially inwardly directed wheel forces are transmitted to the shaft.

BRIEF SUMMARY OF THE INVENTION

The present invention resides in a hub assembly for supporting both radial and axial loads and for effecting a change in angular velocity about an axis of rotation. The hub assembly has a carrier that is capable of being secured to a supporting structure, a central shaft located within the carrier, and a hub located around the carrier. The shaft defines first and second inner tapered raceways and the hub defines first and second outer tapered raceways. Planet rollers are arranged in two rows between the inner raceways that are carried by the shaft and the outer raceways that are carried by the hub. The planet rollers revolve on planet axles that form part of the carrier and can include bearings to facilitate rotation of the planet rollers about the axles to facilitate the transfer of loads from the hub to the carrier and the supporting structure while bypassing the central shaft. The hub assembly preferably includes sun rollers on the shaft. The inner tapered raceways are preferably defined by the sun rollers.

The planet axles are supported on seats on the carrier which substantially prevent the axles from moving radially inwardly toward the central shaft. While the planet axles on the carrier can move outwardly relative to the shaft to allow the internal loading resulting from separation of inner raceways on the shaft being transmitted to the hub, they can not, as just noted, move radially inwardly. This enables the hub to bear external loads. Loads from the hub are transmitted to the planet rollers, to the axles, and then to the carrier. The external loads by-pass, or are not directed to, the central shaft about which the hub rotates.

A rotating item, such as a vehicle wheel, is mounted to the hub. In operation, rotation of the shaft causes the sun rollers to rotate; frictional engagement of the sun rollers with the planet rollers then causes the planet rollers to rotate about the axles; and frictional engagement of the planet rollers with the hub causes the hub to rotate about the shaft. The hub assembly thus forms a friction or traction drive which drives, for example, a vehicle wheel mounted to the hub, and at the same time, provides speed reduction between the rotational speed of the shaft and the rotational speed of the hub.

BRIEF DESCRIPTION OF THE SEVERAL VIEWS OF THE DRAWINGS

Corresponding reference numerals will be used throughout the several figures of the drawings.

DETAILED DESCRIPTION

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

Figure 1:
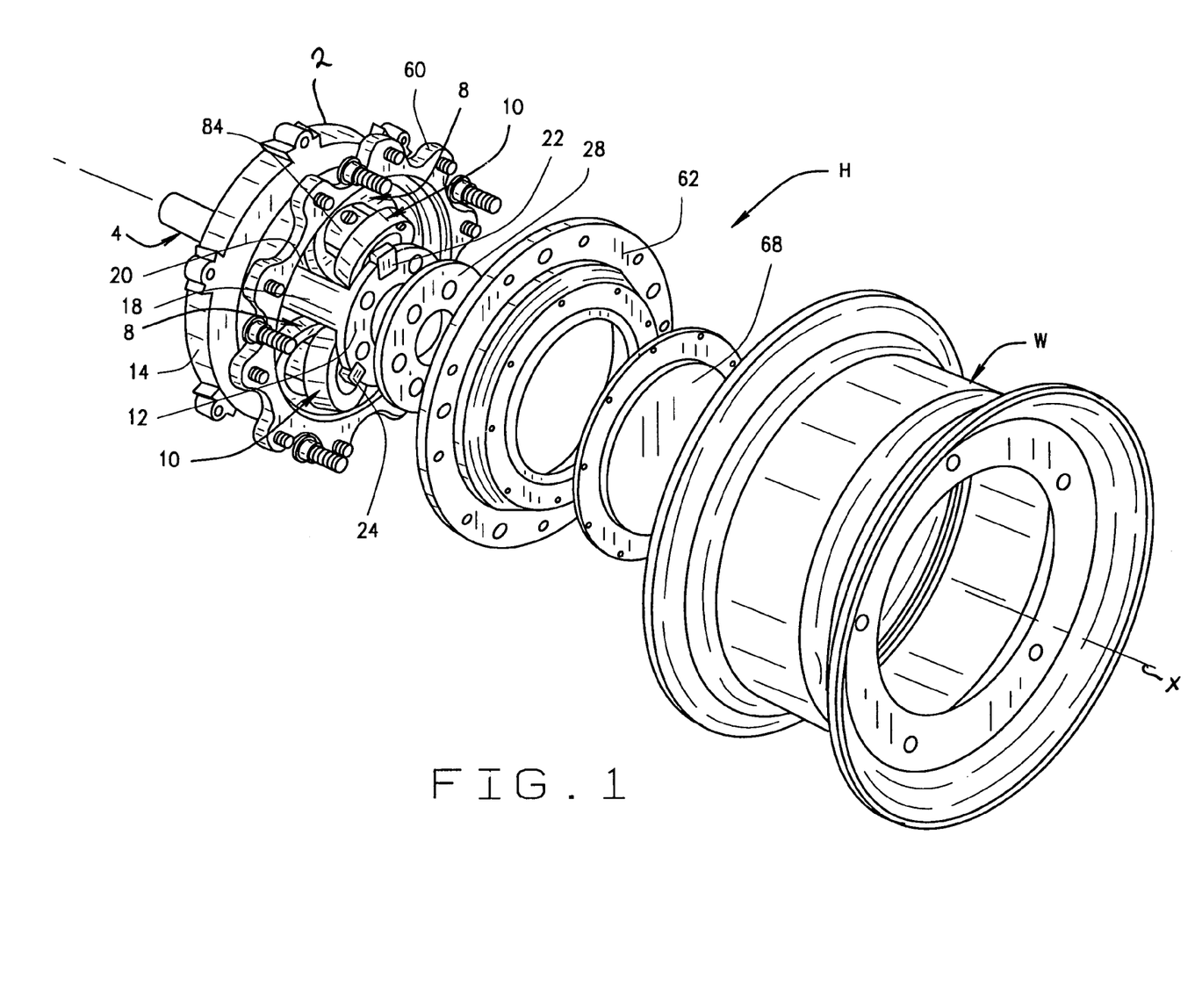
FIG. 1 is an exploded perspective view of a hub assembly constructed in accordance with and embodying the present invention together with a wheel that is mounted on the hub assembly.

Referring now to the drawings, a hub assembly H (FIGS. 1 and 2) couples a vehicular wheel W to the suspension system of an automotive vehicle. In addition, it transfers torque to the wheel W, so that the wheel W will rotate and propel the vehicle. That torque derives from an internal combustion engine, electric motor, or other prime mover, and may be transferred to the hub assembly H through shafts. Where the torque is derived from an internal combustion engine, the hub assembly H is attached directly to the suspension system of the vehicle; and, where the torque is derived from an electric motor, the hub assembly H may be attached indirectly to the electric motor. The hub assembly H provides an axis X about which the wheel W rotates. Not only does the hub assembly H confine the wheel radially with respect to the axis X, but it also prevents the wheel W from being displaced axially in either direction along the axis X.

In one illustrative embodiment, the hub assembly H includes a carrier 2 (FIGS. 1 and 2) which is mounted on a component (not shown) of the suspension system of the vehicle. A center shaft 4 extends into and rotates in the carrier about the axis X. In addition, the carrier 2 has a hub 6 which rotates around the axis X and planet rollers 8 and 10 which are organized in two rows between the interior of the hub 6 and the exterior of the shaft 4. The planet rollers 8 and 10 transfer torque from the center shaft 4 to the hub 6 and in so doing enable the hub 6 to rotate around the axis X, although at a reduced angular velocity.

Figure 5:
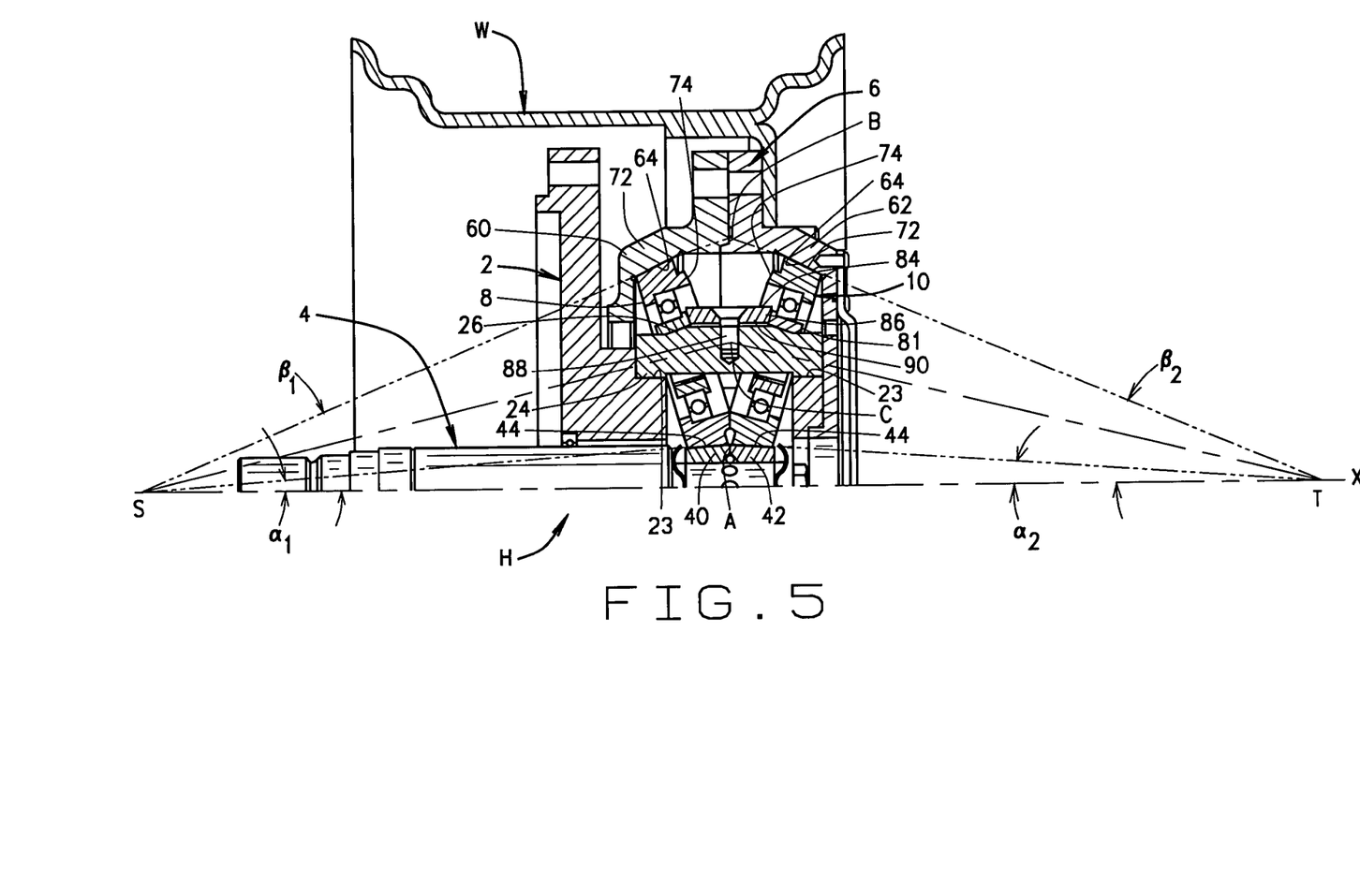
FIG. 5 is a half-sectional view of the hub assembly showing the envelopes of surfaces along which frictional contact exits.

The carrier 2 has a spindle 12 (FIG. 2) and a flange 14 formed integral with the spindle 12 at one end of the spindle 12. It also has a central bore 16 which extends completely through it along the axis X, opening at one end out of the flange 14 at its other end out of the free end of the spindle 12. Between that free end and the flange 14 the spindle 12 has a cylindrical exterior surface 18 (FIGS. 1 and 2) which is interrupted by three roller cavities 20 that open into the bore 16 as well as out of the surface 18. In the embodiment shown, the cavities 20, which are spaced at equal circumferential intervals, occupy more of the exterior of the spindle 12 than the cylindrical surface 18. However, depending on the size of the cavities 20 and the circumference of the spindle 12, the ratio of the exterior surface of the spindle to the cavity can change. The cylindrical surface 18 completely surrounds the spindle 12 beyond the ends of the cavities 20, leaving the ends of the cavities 20 offset from the flange 14 and from the end face at the free end of the spindle 12 as well. In these end regions the spindle 12 has notches 22 which are centered midway between the sides of the cavities 20, there being a pair of notches 22 for each cavity 20 which define seats 23 (FIGS. 2 and 5).

The carrier 2 also includes roller axles 24 (FIG. 2) which bridge the cavities 20 midway between the sides of the cavities 20, there being a separate axle 24 for each cavity 20. The ends of the axles 24 fit into the notches 22 that open out of the cylindrical surface 18 of the spindle 12 to be radially supported by the seats 23, so that the notches 22 confine the axles 24, and prevent the axles 24 from moving radially inwardly (as well as circumferentially) relative to the center shaft 4. Each axle 24 has a generally rectangular cross-section (FIG. 3) and two convex bearing seats 26 (FIG. 2), which taper downwardly away from each other. Finally, the carrier 2, against the end face at its free end, has a retaining plate 28 which is secured with machine screws and extends over the ends of the three axles 24. As best seen in FIG. 2, the retaining plate 28 traps the axles 24 in the notches 22 to prevent the axles from moving axially relative to the shaft 4. As noted above, the notch seats 23 retain the plates radially, and prevent the axles from moving radially inwardly. Hence, the axles 24 can only move radially outwardly.

Figure 2:
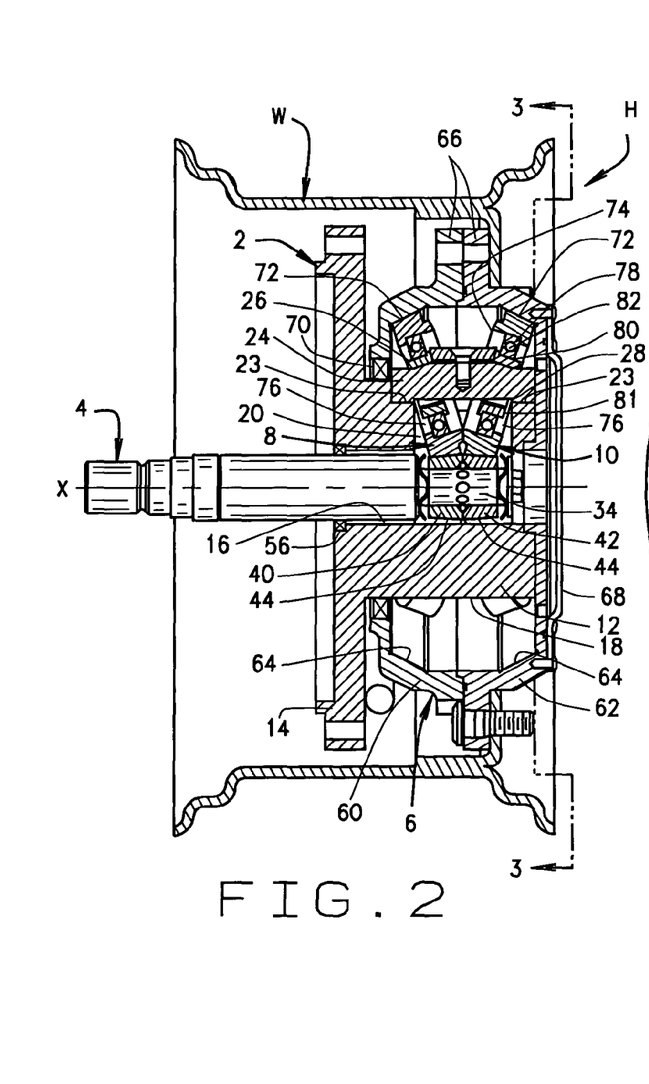
FIG. 2 is a longitudinal sectional view of the hub assembly.
Figure 3:
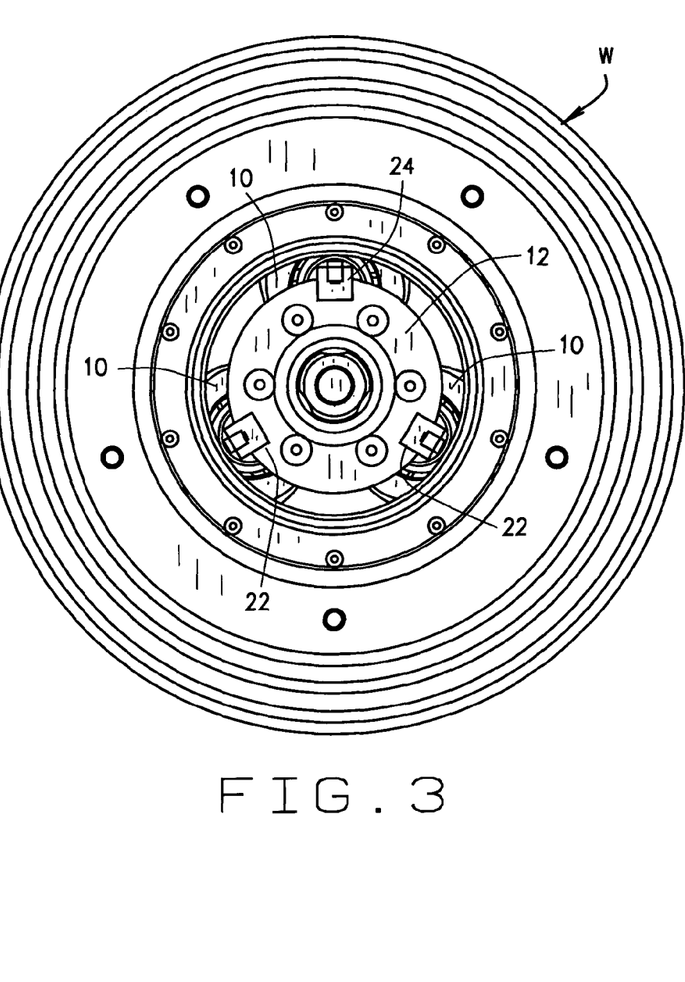
FIG. 3 is a transverse sectional view of the hub assembly taken along line 3—3 of FIG. 2.
Figure 4:
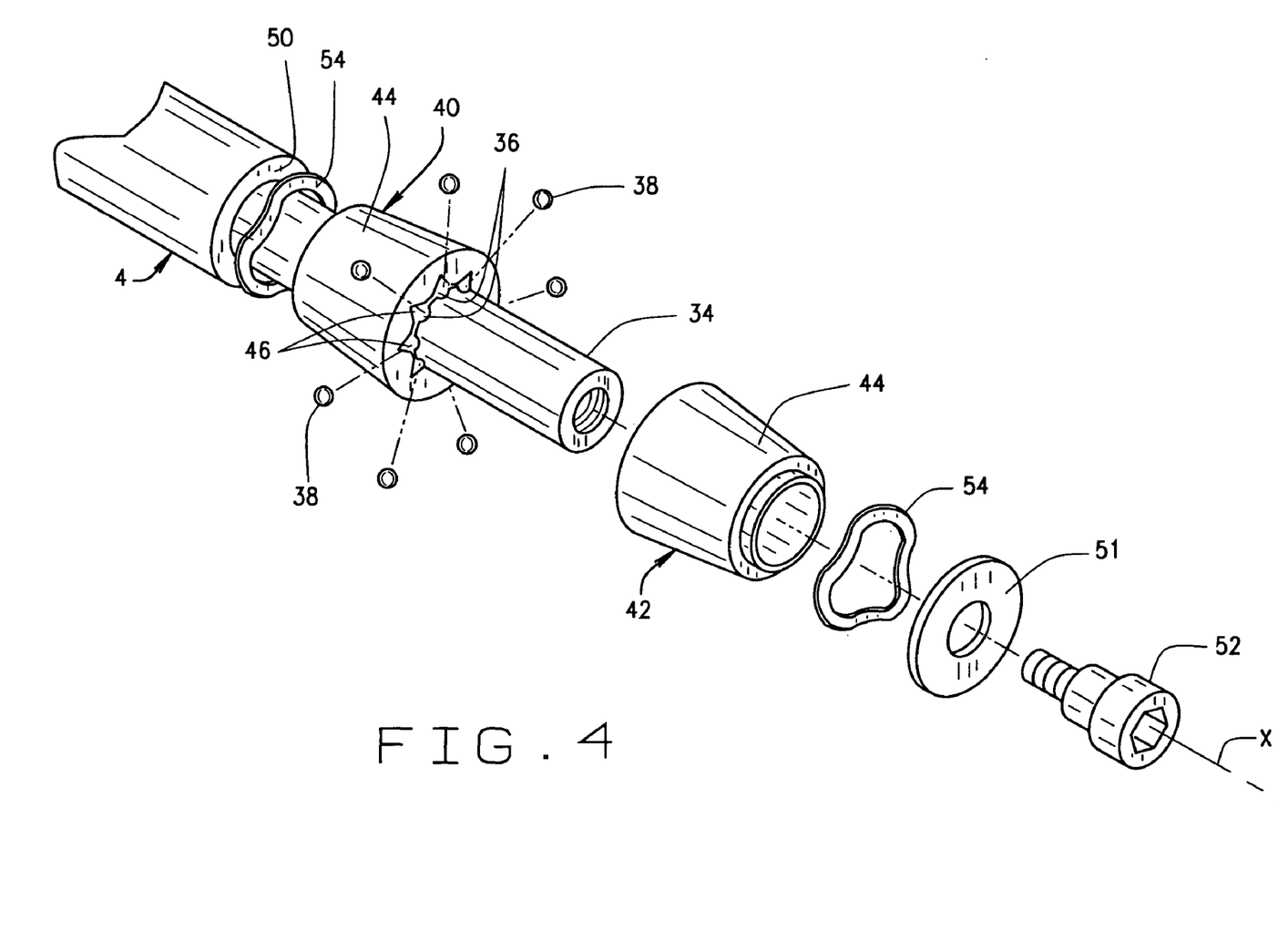
FIG. 4 is a fragmentary, exploded perspective view of the center shaft forming part of the hub assembly.

The center shaft 4 extends into the central bore 16 of carrier 2 from the end on which the flange 14 is formed and it terminates within the spindle 12 (FIG. 2). In the region of the cavities 20, the shaft 4 itself is provided with a spindle 34, which in the embodiment shown in FIG. 4, has slightly elliptical sockets 36 opening out of it generally midway between its ends. The sockets 36 are arranged at equal circumferential intervals around the spindle 34 with their major axes extending parallel to the axis X. The sockets 36 contain balls 38.

The shaft 4 (FIGS. 2 and 4) includes two sun rollers 40 and 42 which are fitted to its spindle 34. Each sun roller has a tapered raceway 44 that is presented outwardly away from the axis X, with the two raceways 44 tapering downwardly away from each other so the two rollers 40 and 42 have their greatest diameters where they are closest. The rollers 40 and 42 fit loosely enough over the spindle 34 to rotate and move axially on the spindle 34, but these motions are for the most part limited by the balls 38 that are in the sockets 36 of the spindle 34. To this end, the two sun rollers 40 and 42 have sockets 46 (FIG. 4) which open out of their closely spaced end edges that are along the spindle 34 and which receive the balls 38. The sockets 46 are preferably formed by a V-shaped cuter. The balls 38 key the two rollers 40 and 42 to the spindle 34, so that the rollers 40 and 42 are rotated by the drive shaft 4, to which they are fitted.

The spindle 34 projects from a shoulder 50 (FIG. 4) on the shaft 4, and at its other end has a machine screw 52 threaded into it. The rollers 40 and 42 are captured between the shoulder 50 and a flat washer 51 which is secured in place by the machine screw 52. The rollers 40 and 42 are urged together by biasing members, such as wave washers 54, one being between shoulder 50 and the end of the roller 40 and the other being between the washer 51 and the end of the roller 42. When the balls 38 transfer torque between the spindle 34 and the rollers 40 and 42, the rollers 40 and 42 are urged apart against the bias of the two wave washers 54, this being a consequence of the camming action of the balls 38 moving along the surfaces of the sockets 36 and 46. Hence, the balls 38 define a camming mechanism which urge the sun rollers apart against the bias or force of the wave washers when the shaft 4 is rotated.

Figure 7:
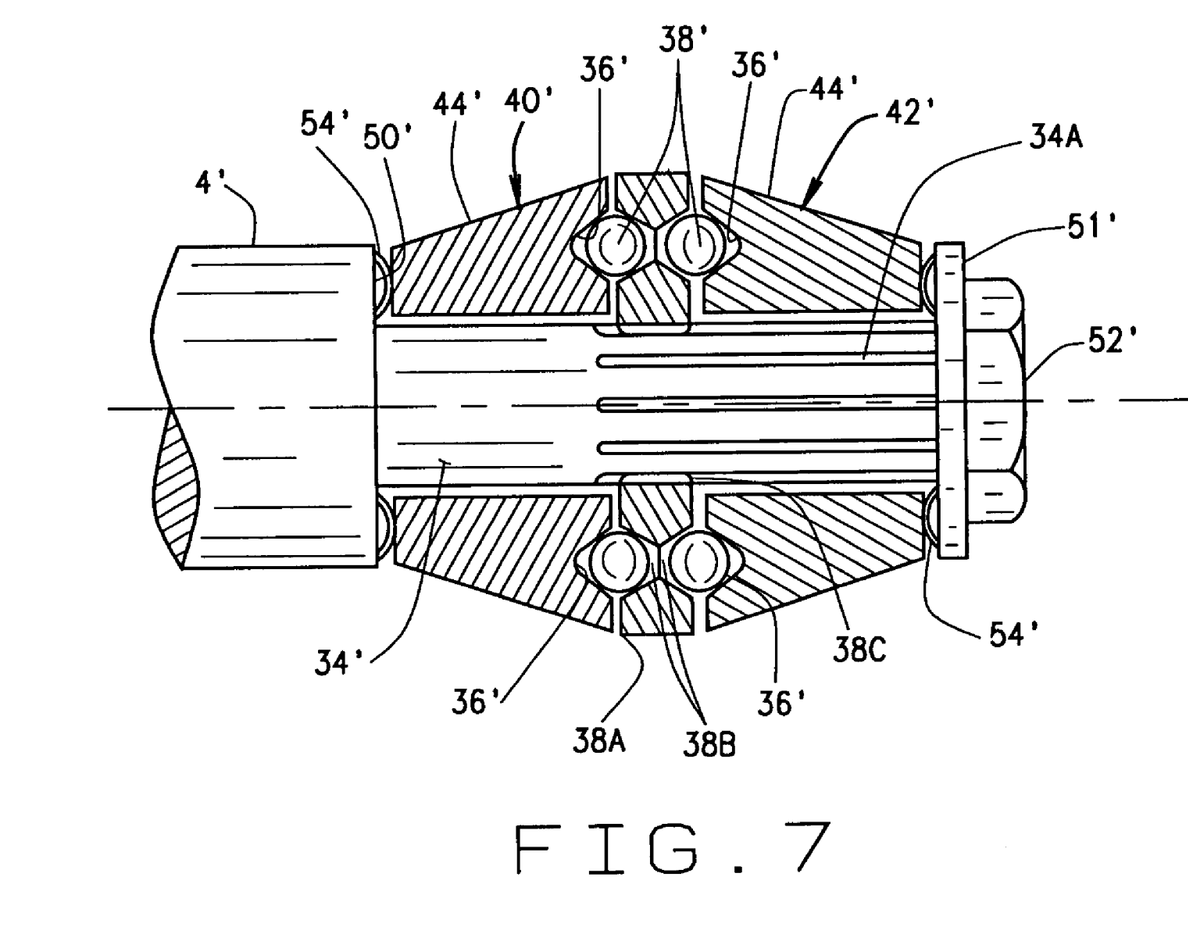
FIG. 7 is a fragmentary view, partly in cross-section, of an alternative ramp-loading mechanism.

Another ramp-loading or camming mechanism is shown in FIG. 7. In this ramp-loading mechanism, a spindle 34' extends from a shaft 4'. The spindle 34' includes a plurality of axially extending grooves 34A which extend rearwardly from the free end of the spindle. The spindle 34' is smaller in diameter than the shaft 4', and the two, in combination, define a shoulder 50', against which a wave washer 54' or other biasing member is positioned. A pair of sun rollers 40' and 42' are journaled on the spindle 34' to be rotatable about the spindle. The rollers 40' and 42' are tapered rollers and define raceways 44' on their outer surfaces. The rollers are positioned such that their wider diameter ends face each other. The rollers 40' and 42' include sockets 36' which receive balls 38'. The bails 38' are spaced from the spindle 34', and are held in position by a ball cage 38A. The ball cage 38A has sockets 38B which are aligned with the roller sockets 36'. The ball cage 38A includes ribs or splines 38C which mate with the spindle grooves 34A to rotationally fix the ball cage 38A to the spindle 34'. Hence, the ball cage 38A will not rotate relative to the spindle 34'. The ball cage 38A could be rotationally and axially fixed to the shaft 34' in any other conventional manner. A second wave washer 54' or biasing element is placed against the smaller diameter face of the roller 42'. A washer 51' is placed against the wave washer 54', and a bolt 52' is threaded into the end of the spindle 34' to hold the ramp-loading mechanism or assembly together. In FIG. 7, the cage 38A with the balls 38' define a camming mechanism which urges the sun rollers apart against the force or bias of the wave washers when the shaft is rotated.

Figure 10:
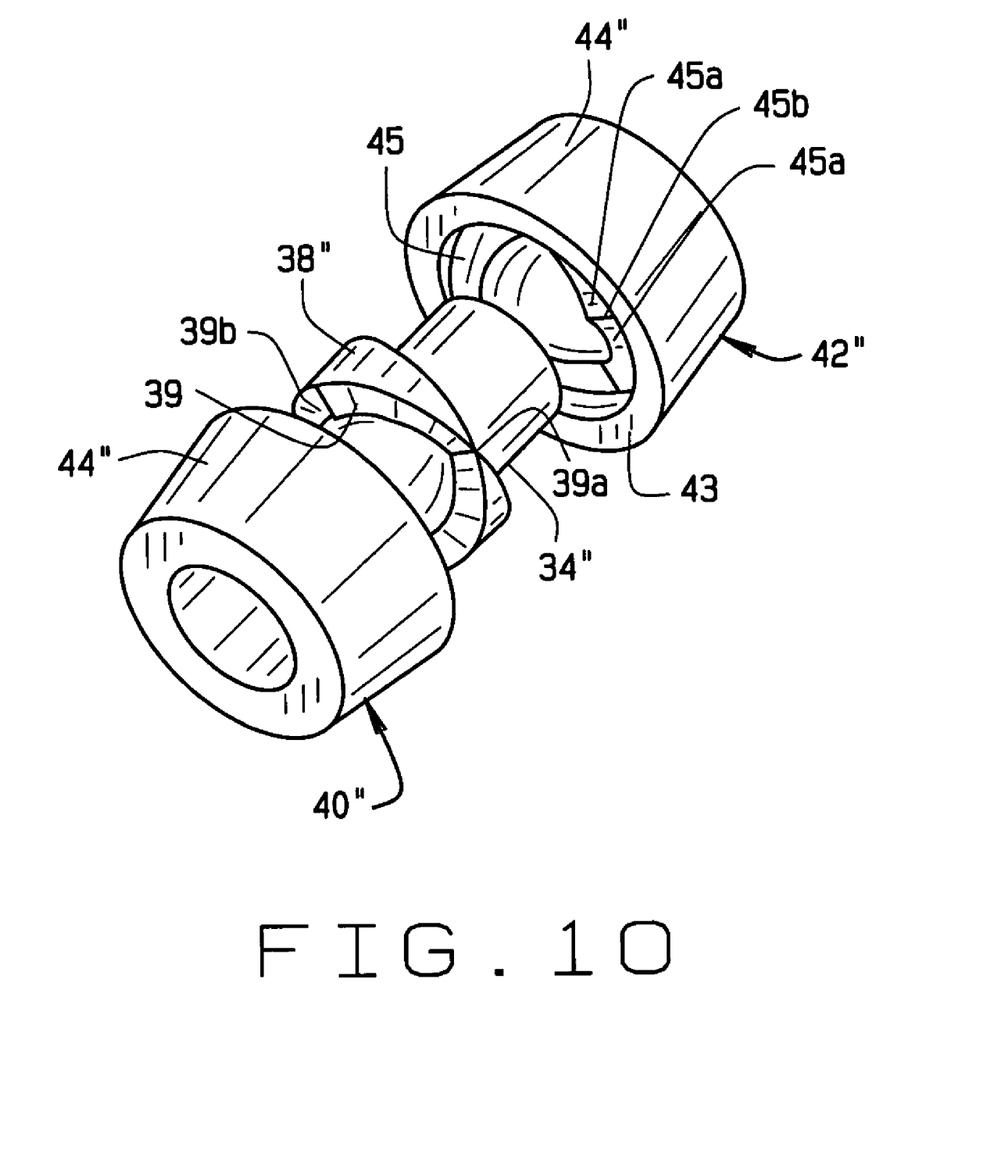
FIG. 10 is a perspective view of another alternative ramp loading mechanisms.

A third ramp loading mechanism is shown in FIG. 10.—In this ramp-loading mechanism, a spindle 34" extends from a shaft (not shown). A pair of sun rollers 40" and 42" are journaled on the spindle to be rotatable about the spindle. The rollers are each tapered rollers and define raceways 44" on their outer surfaces and are positioned such that their wider ends face each other. The sun rollers each include an axially extending lip 43 which defines an axially facing cam race 45 along the inner surface of the lip 43. The cam race 45 includes a ramped portion 45a which slopes downwardly on both sides from an apex 45b. A ring 38" is fixed to the spindle 34" between the two sun rollers 40" and 42". The ring 38" can be integrally formed with the spindle 34" or can be secured to the spindle in any conventional manner which will positionally and rotationally fix the ring 38" relative to the spindle 34". The ring 38" includes a pair of opposed side surface 39 which extend perpendicularly or radially from the spindle 34". The opposed surfaces 39 each slope outwardly from a narrow section 39a of the ring to a wide section 39b of the ring. There are two narrow sections 39a which are spaced about 180° apart and two wide sections which also are spaced about 180° apart. The narrow and wide sections 39a and 39b are spaced about 90° apart. The expanding and narrowing shape of the ring 38" form a ramping cam. The ring or ramping cam 38" and cam race are formed by a sweeping line that is perpendicular to the spindle 34" and that sweeps along a helical path. The two sun rollers 40" and 42" are held on to the spindle 34" by any conventional means, Additionally, they are biased towards the ring or cam 38" by a pair of wave washers, for example. As can be appreciated, when the spindle 34" is rotated due to rotation of the shaft, the cam 38" will rotate, thereby urging the sun rollers 40" and 42" apart against the bias of the wave washers.

Where the center shaft 4 emerges from the carrier 2, that is, on the backside of the flange 14, the carrier is fitted with a seal 56 (FIG. 2) which establishes a barrier along the shaft 4.

The hub 6 encircles the spindle 12 on the carrier 2 and has two rings 60 and 62 (FIGS. 1 and 2) which are held together with machine screws. Each ring 60 and 62 has a raceway 64 (FIG. 2) which is presented inwardly toward the axis X, and although the two raceways 64 are spaced apart, they are tapered radially inwardly and away from each other. Thus, the raceways 64 define the largest diameter toward the center of the hub 6, where the two raceways are closest together. Conversely, the raceways 64 define the smallest diameter at the outer ends of the raceways, where the raceways 64 are farthest apart. The raceway 64 on the ring 60 is presented toward the raceway 44 on the sun roller 40, whereas the raceway 64 on the ring 62 is presented toward the raceway 44 on the sun roller 42. The conical envelopes formed by the raceways 44 and 64 for the sun roller 40 and ring 60 have their apices at a common point S (FIG. 5) along the axis X. Likewise the conical envelopes formed by the raceways 44 and 64 on the rollers 42 and 62 have their apices at another common point T along the axis X.

The two rings 60 and 62 abut each other along flanges 66 (FIG. 2), and here they are held firmly together with machine screws. The wheel W is attached to the flange 66 of the ring 62 with lug bolts and hence rotates with the hub 6.

The hub 6 also includes an end cap 68 (FIGS. 1 and 2) which is attached to the ring 62 to close the otherwise open end of the ring 62 and thereby isolate the interior of the hub 6, the sun rollers, and the planet rollers 8 and 10 from contaminants. At the opposite end of the hub 6, which is next to the flange 14 on the carrier 2, the ring 60 carries a seal 70 (FIG. 2) which establishes a barrier around the cylindrical surface 18 of the spindle 12.

The planet rollers 8 and 10 revolve about the axles 24 of the carrier 2 without undergoing any orbital motion, the rollers 8 being organized in one row between the sun roller 40 and the ring 60 and the rollers 10 being organized in another row between the sun roller 42, 42' or 42" and the ring 62. Each roller 8 and 10 has (FIG. 2) a tapered side face 72 and a beveled end face 74. Each contains an antifriction bearing 76 having an outer race 78 fitted to the interior of the roller 8 or 10, an inner race 80 fitted over a sleeve 81 which is fitted over the axle 24 for the roller 8 or 10, and rolling elements 82 arranged in a single row between two races 78 and 80. The sleeve 81 has a cylindrical exterior surface and a rectangular interior bore. The interior of the sleeve 81 conforms generally to the generally rectangular cross section of the axle 24 over which it is fitted. To this end, the sleeve 81 has four flat interior surfaces, three of which lie along the flat sides of the axle 24, and a cylindrical exterior surface end which conforms to the inner race 80 of the bearing 76. The bearings 76 enable the rollers 8 and 10 to transfer both radial and axial loads to the axles 24 at the inclined bearing seats 26 on the axles 24. Each axle 24 supports a single planet roller 8 and a single planet roller 10, with their end faces 74 presented toward and contacting each other. The rollers 8 and 10 that are on an axle 24 form a set or pair.

The planet rollers 8 along their tapered side faces 72 contact the raceways 44 and 64 of the sun roller 40, 40' or 40" and ring 60, respectively, there being line contact (FIG. 5). Thus, the rollers 8 are on apex, meaning that the conical envelopes formed by their tapered side faces 72 have their apices at the common point S along the axis X shared by the conical envelopes for the raceway 44 and 64 between which the rollers 8 are located. This produces pure rolling contact between the rollers 8 and the raceways 44 and 64 between which they are located, that is to say contact which is characterized by the absence of spinning along the lines of contact.

Likewise, the rollers 10 along their side faces 72 contact the raceways 44 and 64 of the sun roller 42, 42' or 42" and ring 62, respectively, there again being line contact (FIG. 5). Hence, the rollers 10 are on apex, and as such the envelopes formed by their conical side faces 72 have their apices at the point T along the axis X shared by the apices of the envelopes for the raceways 44 and 64 between which the rollers 10 are located. This produces pure rolling contact between the rollers 10 and the raceways 44 and 64 of the sun roller 42 and ring 62.

The pair of planet rollers 8 and 10 on each axle 24 contact each other along their beveled end faces 74 and here line contact exists as well (FIG. 5). Moreover, the contact lies along a straight line that connects the point A of intersection for the envelopes for the two inner raceways 44, the point B of intersection for the envelopes for the two outer raceways 64, and the point C of intersection for the axes of the two rollers 8 and 10. That connecting line also intersects the axis X at an angle of about 90°. The tapered geometry of the rollers 8 and the raceways 44 and 64 along which they are located prevents the rollers 8 from moving down the raceways 44 and 64 and away from the rollers 10. Likewise the tapered geometry of the rollers 10 and the raceways 44 and 64 between which they are located prevents them from moving down their raceways 44 and 64 and away from the rollers 8. Since the rollers 8 and 10 on any axle 24 contact each other along their beveled end faces 74, the rollers 8 and 10 cannot move up their respective raceways 44 and 64 either. In other words, the rollers 8 back the rollers 10, and the rollers 10 back the rollers 8. In effect, the rollers 8 are captured between the raceways 44 and 64 of the sun roller 40, 40' or 42" and ring 60, in the sense that they cannot be displaced axially, and likewise the rollers 10 are captured between the raceways 44 and 64 of the sun roller 42, 42' or 42" and ring 62 in the sense that the rollers 10 cannot be displaced axially.

To insure that the inner races 80 for the bearings 76 do not migrate up their tapered seats 26 on the axles 24, each axle 24 is fitted with a spacer 84 (FIG. 5) in the region between its two bearing seats 26. Each spacer 84 has end faces 86 which are beveled such that they lie perpendicular to the tapered bearing seats 26. The spacer 84 is attached to its axle 24 with a machine screw 88, and between the spacer 84 and the axle 24 lies a shim 90. The thickness of the shim 90 determines the spacing between the inner races 80 of the two bearings 76.

When the hub assembly H is installed on an automotive vehicle, the flange 14 of the carrier 2 is secured with bolts to the suspension system of the vehicle. The wheel W of course has a pneumatic tire fitted to it and that tire contacts a road surface. The center shaft 4 is coupled to a motor, whether it be an electric motor or an internal combustion engine. That motor exerts torque on the drive shaft 4, causing the shaft 4 to rotate.

The sun rollers, being keyed to the spindle 34 of the drive shaft 4 by the camming or ramp loading mechanism, rotate with the shaft 4. In so doing, they exert torque on the planet rollers 8 and 10, inasmuch as the sun rollers along their raceways contact the planet rollers 8 and 10 along their tapered side faces 72. The friction between the sun roller raceways and the tapered planet roller side faces 72 is enough to impart rotation to the planet rollers 8 and 10, with primarily pure rolling contact existing at the lines of contact between the sun roller raceways and the tapered side faces 72 of the planet rollers 8 and 10; that is to say contact is characterized by the absence of spinning at the line of contact.

The camming or ramp loading mechanism key the two sun rollers to the spindle of the center shaft 4 and transfer the torque from the spindle to the sun rollers. In the camming or ramp loading mechanism of FIGS. 4 and 7, the balls 38 and 38' bear against the sides of the ball holding sockets in the sun rollers, and since the sides of the sun roller sockets 46 are somewhat oblique to the opposed end faces of the sun rollers, a camming action develops which urges the sun rollers apart. This drives the raceways of the sun rollers tightly against the tapered side faces 72 of the planet rollers 8 and 10 and lodges the planet rollers 8 and 10 tightly between the sun rollers 40 and 42 and the rings 60 and 62. Thus, the tapered side faces 72 of the planet rollers 8 and 10 bear tightly against the tapered raceways 64 on the rings 60 and 62. The rotating planet rollers 8 and 10 impart rotation to the two rings 60 and 62 of the hub 6. Pure rolling contact likewise exists at the lines of contact between the tapered side faces of the planet rollers 8 and 10 and the raceways 64 of the rings 60 and 62, that is to say contact characterized by the absence of spinning at the lines of contact. The hub 6 rotates and turns the wheel W, propelling the vehicle.

The ramp loading mechanism of FIG. 10 works in much the same way. However, rather than having balls interacting with sockets in the end surfaces of the sun rollers, the ramp or cam surface of the ring 39 engages the ramp or cam race of the sun rollers to urge the sun rollers apart. This drives the raceways of the sun rollers tightly against the tapered side faces 72 of the planet rollers 8 and 10 and lodges the planet rollers 8 and 10 tightly between the sun rollers 40 and 42 and the rings 60 and 62. Hence, rotational motion of the shaft is transferred to the hub and ultimately to the vehicle wheel and pneumatic tire.

The bearings 76 enable the planet rollers 8 and 10 to rotate on the axles 24, and the axles 24 serve to position the planet rollers 8 and 10 between the sun rollers and the rings 60 and 62 at equal circumferential intervals. Aside from preventing the planet rollers 8 and 10 from migrating, the bearings 76 also carry loads directed radially and/or axially toward the axis X. In fact, the loads are transferred from the hub, to the axle 24 and then to the carrier. Because the carrier prevents the axle 24 from moving radially inwardly, wheel loads are not transferred to the sun rollers or the center shaft 4. Rather, the loads by pass the center shaft 4 and are transmitted to the supporting structure to which the carrier is mounted.

As the planet rollers 8 and 10 on each axle 24 rotate, they roll against each other at their beveled end faces 74. The contact between the end faces 74 for any set of planet rollers lies along a line which passes through the point A of intersection of the envelopes formed by the raceways 44, the point B of intersection for the envelopes formed by the raceways 64, and the point C of intersection of the axis of the two rollers 8 and 10 (FIG. 5). The result is pure rolling contact, characterized by the absence of spinning, at the line of contact. While their tapered geometry prevents the planet rollers 8 and 10 from moving down the raceways 44 and 64 along which they roll, the rollers 8 and 10 of each axle 24 back each other and thus are prevented from moving up their raceways 44 and 64.

The planet rollers 8 and 10 serve to transfer torque between drive shaft 4 and the hub 6, with a reduction in angular velocity and a corresponding increase in torque. In this sense the planet rollers 8 and 10 serve as idlers. The speed ratio K becomes $$K = \frac{\sin \beta_1}{\sin \alpha_1} = \frac{\sin \beta_2}{\sin \alpha_2}$$

where $\alpha_1$ and $\alpha_2$ are the half angles of the envelopes for the raceways 44 on the sun rollers, and $\beta_1$ and $\beta_2$ are the half angles of the envelopes for the raceways 64 on the rings 60 and 62.

The rollers 8 and 10 also serve to transfer the weight of the vehicle to the wheel W. In this regard, the vertical force represented by the load at the suspension system component is transmitted to the rollers 8 and 10 at the axles 24 that are below the axis X, with the transfer being through the bearings 76 on those axles 24, and the rollers 8 and 10 in turn transfer it to the hub 6. This load is transferred from the rollers 8 and 10 to the axle 24. As noted above, the axle 24 is prevented from moving radially inwardly. Hence, the load is transferred from the axle to the carrier 2, and then to the suspension member to which the carrier 2 is mounted. As can be appreciated, this construction isolates the shaft 4 and the sun rollers from the load; and, the load by passes the shaft 4 and sun rollers. In fact, the shaft 4 with the sun rollers can be removed from within the planet rollers 8 and 10, and the planet rollers and the rings 60 and 62 will maintain their respective positions.

The hub assembly H has applications beyond the automotive field. For example, it may be used to transfer the rotation of the vanes of a windmill to an electrical generator to harness wind to produce electrical energy. In that application, the vanes are coupled to the hub 6, whereas the center shaft 4 drives the electrical generator at an angular velocity greater than that of the hub 6.

Figure 6:
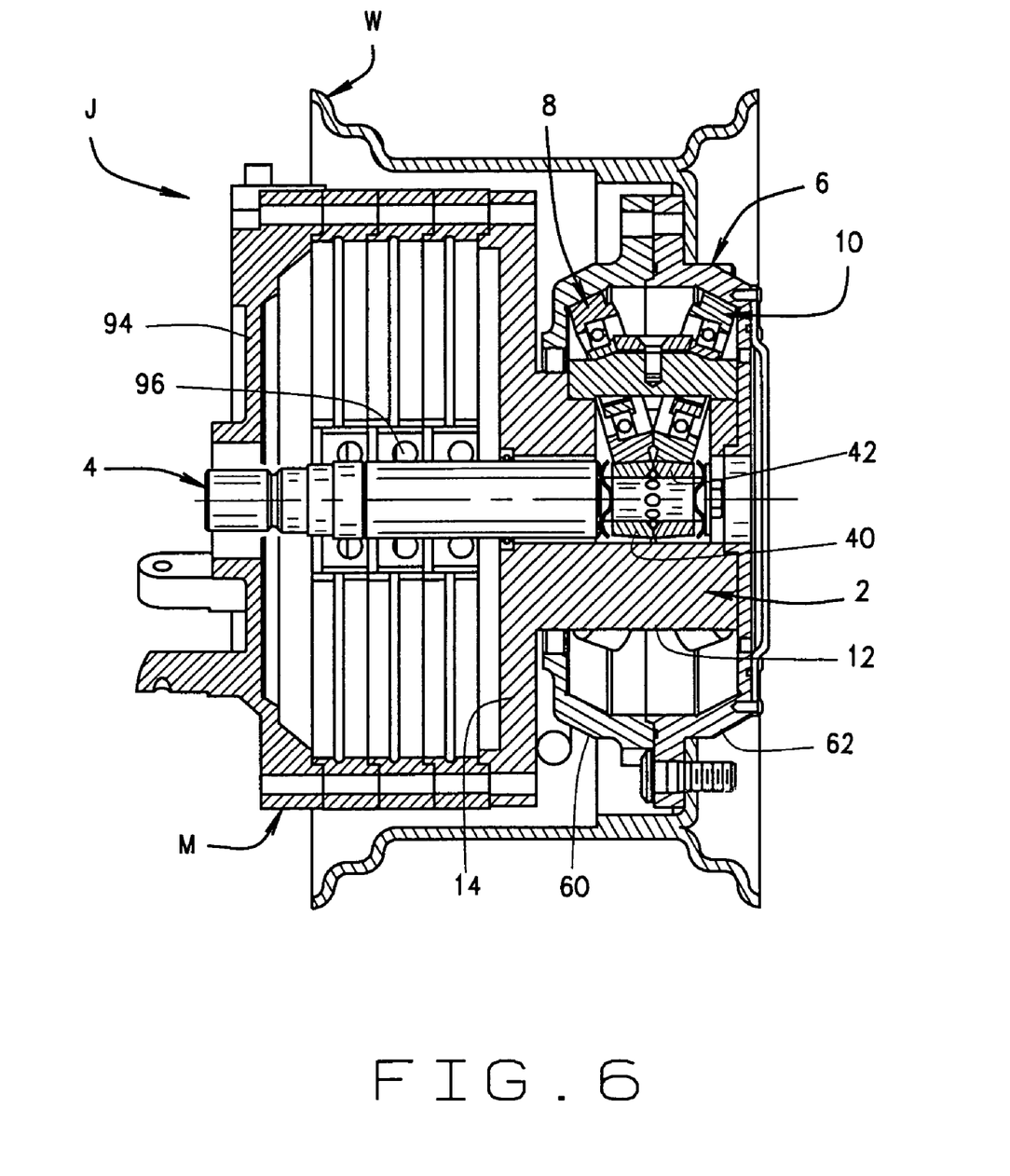
FIG. 6 is a longitudinal sectional view of a modified hub assembly that includes an electric motor or a generator.

A modified hub assembly J (FIG. 6) includes an electric motor M having a housing 94 and an armature 96. The flange 14 on the carrier 2 forms one end of the housing 94. The center shaft 4 extends into the housing 94 and supports the armature 96. The magnetic field developed by field windings in the motor M rotates the armature 96 which, being on the shaft 4, rotates the shaft 4. The hub 6 and wheel W rotate at a lesser velocity.

Figure 8:
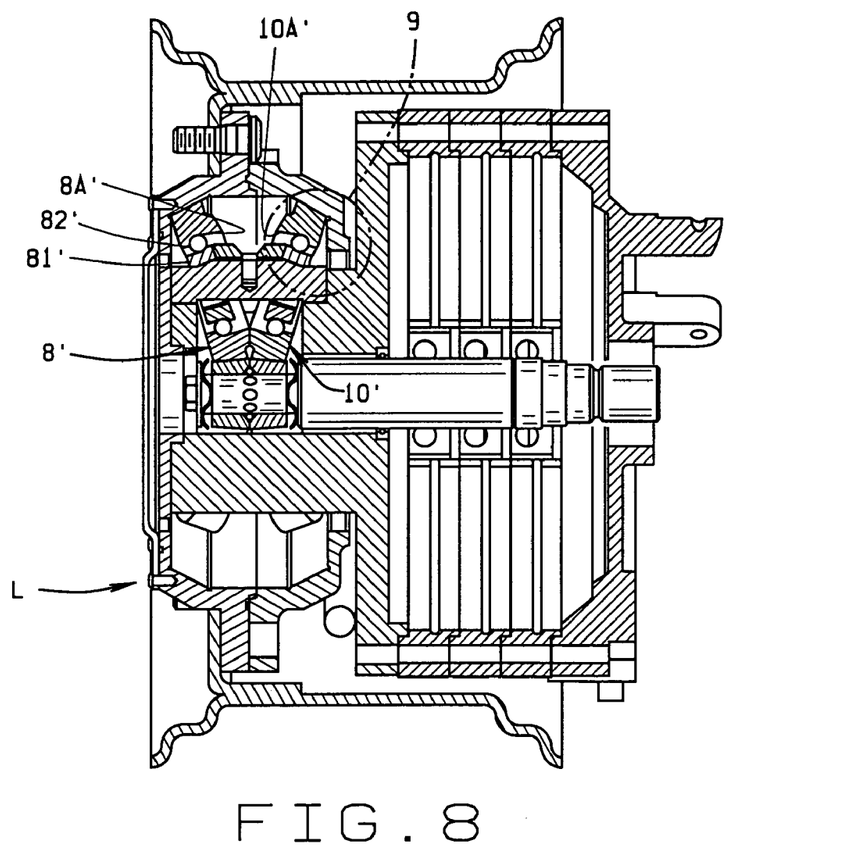
FIG. 8 is a cross-sectional view of a second alternative hub assembly in which rolling element bearings are incorporated into planetary rollers of the hub assembly.
Figure 9:
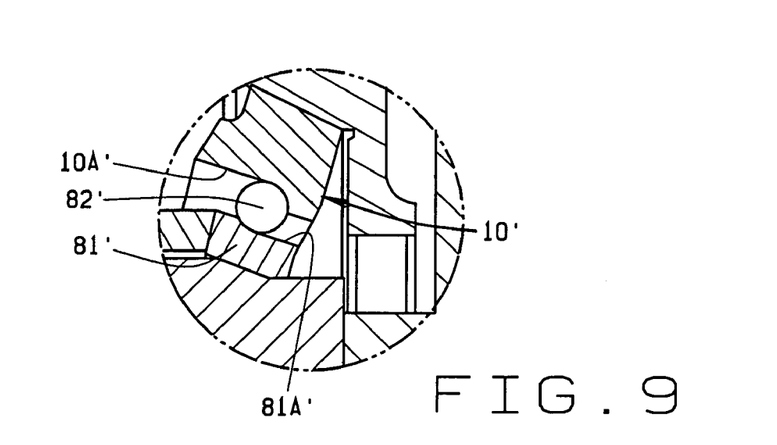
FIG. 9 is an enlarged fragmentary sectional view taken at the circle 9 of FIG. 8.

Another modified hub assembly L is shown in FIG. 8. The hub assembly L has integrated planetary rollers 8' and 10'. The rolling element bearings 76 of the hub H (FIG. 2) are eliminated. Rather, inner surface 8A' and 10A' of the rollers 8' and 10', respectively, define outer raceways for the rolling elements 82'; and the outer surface 81A' of the sleeve 81' defines the inner raceway for rolling element 82'. Thus, effectively, the outer race 78 of the bearing 76 has been integrated with the rollers 8 and 10; and the inner race 80 has been integrated with the sleeve 81. As can be appreciated, by eliminating the bearings 76 from the hub H, and incorporating them into the rolling elements 8' and 10', as in the hub L, assembly costs for the hub are reduced. Additionally, tolerance stack-ups, which result from assembling discrete parts, are reduced.

As various changes could be made in the above constructions without departing from the scope of the invention, it is intended that all matter contained in the above description or shown in the accompanying drawings shall be interpreted as illustrative and not in a limiting sense. For example, although wave washers are shown to be used to urge the sun rollers together, other types of biasing members could be used. For example, coil springs or resilient materials could be used in lieu of the wave washers. This example is merely illustrative.

What is claimed is:

1. In a traction drive assembly comprising a carrier mountable to a support structure, a center shaft rotatably journaled in said carrier about a central axis; first and second tapered raceways carried by said center shaft and presented outwardly from said axis; a hub surrounding said shaft and having first and second outer raceways presented toward said first and second tapered inner raceways; and first and second planet rollers positioned between said first and second inner and outer raceways, respectively; said planet rollers being rotatable about a planet axis substantially parallel to said central axis; the improvement comprising a load supporting structure to transfer loads from said hub to said carrier and to bypass the central shaft;

said load supporting structure comprising said carrier:
   said carrier comprising a plurality of pockets having radially outwardly directed seats and planet axles received in said pockets and supported on said seats, said pockets substantially preventing said planet axles from moving radially inwardly relative to the central shaft while allowing said planet axles to move radially outwardly relative to said central shaft; said planet rollers being rotatably mounted about said planet axles; whereby, loads from said hub are transferred to said planet rollers, to said planet axles, and then to said carrier, such that said loads bypass said central shaft.

2. The traction drive assembly of claim 1 including a first sun roller and a second sun roller mounted on said center shaft to be rotated by said shaft as said shaft rotates; said first and second sun rollers defining said first and second inner raceways and including first and second ends; said first ends of said sun rollers facing each other.

3. The traction drive assembly of claim 2 including a camming mechanisms which urges said first and second sun rollers apart to enhance engagement between said sun rollers and said planet rollers.

4. The traction drive assembly of claim 3 wherein said camming mechanism comprises a plurality of balls and a biasing member which urges said sun rollers together.

5. The traction drive assembly of claim 4 wherein said shaft including a plurality of recesses; said sun rollers including a plurality of recesses formed in the first ends of said sun rollers; said recesses in said shaft and said sun rollers being sized to partially receive said balls; such that when said sun rollers are urged together by said biasing member, said recesses in said sun rollers and said shaft will cooperate to encase said balls; whereby, as said shaft is rotated, said balls bear against walls of said sun roller recesses to urge said sun rollers apart against the bias of said biasing member.

6. The traction drive assembly of claim 3 including a cage fixed to said shaft and extending radially from said shaft between said first and second sun rollers; said cage including a plurality of recesses and said sun rollers including a plurality of recesses in their respective first ends; said cage recesses and sun roller recesses being alignable with each other; said balls being received in said recesses of said cage and said sun rollers; whereby, as said shaft is rotated, said balls bear against walls of said sun roller recesses to urge said sun rollers apart against the bias of said biasing member.

7. The traction drive assembly of claim 3 wherein said camming mechanism includes a biasing member to urge said sun rollers together, a ring fixed to said central shaft; said ring having at least one surface which is sloped to define a cam ramp, and a cam race on the first end of at least one of said sun rollers; whereby as said shaft rotates, said camming ramp rotates against the cam race of said at least one sun roller to urge said sun rollers apart against the force of said biasing member.

8. The traction drive assembly of claim 1 wherein said planet axle carries first and second tapered raceways directed outwardly from planet axis.

9. The traction drive assembly of claim 1 including a spacer on said planet axle between said first and second planet rollers.

10. The traction drive assembly of claim 1 wherein said planet axle is generally quadrilateral in radial cross-section.

11. The traction drive assembly according to claim 1 wherein the first raceways taper downwardly toward the axis in the same direction, and the second raceways taper downwardly toward the axis in the same direction and in the direction opposite to that in which the first raceways taper.

12. The traction drive assembly according to claim 11 wherein each of the raceways has a large end; and wherein the first and second inner raceways are closest at their large ends and the first and second outer raceways are closest at their large ends.

13. The traction drive assembly according to claim 1 where each planet axle has a first and a second planet roller around it.

14. The traction drive assembly according to claim 13 wherein the first and second planet rollers have end faces, and the first and second planet rollers around each axle contact each other at their end faces.

15. The traction drive assembly according to claim 14 wherein pure rolling contact exists between the side faces of first rollers and the first raceways, between the side faces of the second rollers and second raceways, and between the end faces of the first and second rollers around each axle.

16. The traction drive assembly according to claim 1 including bearings located between the planet rollers and the planet axles for transferring radial loads between the carrier and rollers.

17. In combination with a supporting structure, a hub assembly for facilitating rotation about an axis that is fixed in position with respect to the supporting structure, said hub assembly comprising:
a carrier attached securely to the supporting structure and including axles extending generally axially and arranged around the axis;
a center shaft located within said carrier and carrying first and second inner raceways which are presented outwardly away from the axis and tapered downwardly away from each other so that the inner raceways are closest where they have their greatest diameters; the shaft having a spindle located within the carrier; the spindle of the shaft containing sockets that open outwardly away from the axis;
a hub located around the axles of the carrier and having first and second outer raceways which taper downwardly away from each other so that the first and second outer raceways are closest where they have their greatest diameters, the first outer raceway being presented toward the first inner raceway and the second outer raceway being presented toward the second inner raceway;
first planet rollers located around the axles and between the first raceways, each first planet roller having a tapered side face where it contacts the first raceways and an end face generally at the large end of its tapered side face;
second planet rollers located around the axles between the second raceways, each second planet roller having a tapered side face where it contacts the second raceways and an end face generally at the large end of its side face;
the first and second planet rollers around each axle contacting each other at their end faces; the planet rollers being rotatable relative to the axles to transfer between the rollers and the axles loads that are directed radially or axially with respect to the axis whereby both the shaft and hub will rotate about the axis, with the shaft rotating at a velocity greater than the hub;
first and second sun rollers located around the spindle, with the first inner raceway being on the first sun roller and the second inner raceway being on the second sun roller; the sun rollers having sockets that open toward the sockets in the spindle; and wherein the shaft further comprises elements located in the sockets of the spindle and the sockets of the sun rollers to key the rollers to the shaft, the elements and sockets further being configured to effect a camming action that urges the sun rollers apart when torque is transmitted between the sun rollers and the spindle.

18. The combination according to claim 17 wherein said carrier includes axle supporting members against which said planet axles seat to substantially prevent said planet axles from moving radially inwardly relative to said axis.

19. The combination according to claim 17 including bearings located between the axles and the rollers.

20. The combination according to claim 17 wherein the hub comprises first and second rings on which the first and second outer raceways are located, respectively.

21. The combination according to claim 17 wherein the carrier has a flange at which the carrier is attached to the supporting structure and a spindle projecting from the flange with the planet axles being on the spindle of the carrier.

22. The combination according to claim 21 wherein the spindle of the carrier has cavities in which the planet rollers are located.

23. The combination according to claim 19 wherein the planet axles have bearing seats, and the bearings have inner races which fit around the axle bearing seats and rolling elements which are located around the inner races and within the rollers, the inner races being against the axles at the bearing seat to transfer loads from the planet rollers to the axles.

24. The combination according to claim 17 and further comprising a road wheel attached securely to the hub.

25. The combination according to claim 17 and further comprising an electric motor interposed between the carrier of the hub assembly and the supporting structure; and wherein the shaft extends through the motor and is rotated by the motor.

26. The combination according to claim 17 wherein the planet rollers are bearings, the planet rollers including roller inner races and roller outer races and rolling elements positioned between the roller inner and outer races.

27. A hub assembly for supporting radial and axial loads and for effecting a change in angular velocity about an axis of rotation, said hub assembly comprising:
a carrier having axles arranged around the axis and extending generally axially;
a center shaft located along the axis;
a first sun roller and a second sun roller mounted on said center shaft to be rotated by said shaft as said shaft rotates; said first and second sun rollers defining first and second inner raceways that are tapered and are presented outwardly away from the axis;
a hub surrounding the shaft and having first and second outer raceways that are tapered and presented inwardly toward the first and second inner raceways, respectively of the center shaft;
first planet rollers located around the axles and between the first raceways and having side faces where they contact the first raceways; and second planet rollers located around the axles and between the second raceways and having side faces where they contact the second raceways;

said first and second sun rollers including axial inner faces and pockets formed in said inner faces; said shaft including pockets aligned with said pockets of said sun rollers; said hub assembly including wedging elements received in said shaft and sun roller pockets; the engagement of said wedging elements and said shaft and sun roller pockets rotationally connecting said sun rollers to said shaft such that rotation of said shaft rotates said sun rollers.

28. The hub assembly of claim 27 wherein said wedging elements are balls.

29. The hub assembly of 27 wherein said pockets are formed on said shaft.

30. The hub assembly of claim 27 wherein said hub assembly includes a cage fixed to said shaft and extending radially from said shaft between said first and second sun rollers; said pockets being formed in said cage.

31. A hub assembly for supporting radial and axial loads and for effecting a change in angular velocity about an axis of rotation, said hub assembly comprising:
   a carrier having axles arranged around the axis and extending generally axially;
   a center shaft located along the axis;
   a first sun roller and a second sun roller mounted on said center shaft to be rotated by said shaft as said shaft rotates; said first and second sun rollers defining first and second inner raceways that are tapered and are presented outwardly away from the axis; said sun rollers filling loosely over the center shaft; said sun rollers being operatively connected to said center shaft by means of a camming mechanism to be rotated by said center shaft;
   a hub surrounding the shaft and having first and second outer raceways that are tapered and presented inwardly toward the first and second inner raceways, respectively of the center shaft;
   first planet rollers located around the axles and between the first raceways and having side faces where they contact the first raceways; and
   second planet rollers located around the axles and between the second raceways and having side faces where they contact the second raceways.

32. The hub assembly of claim 31 wherein said camming mechanism comprises a plurality of balls and a biasing member which urges said sun rollers together.

33. The hub assembly of claim 32 wherein said shaft includes a plurality of recesses and said sun rollers include a plurality of recesses formed in the first ends of said sun rollers; said recesses in said shaft and said sun rollers being sized to partially receive said balls; such that when said sun rollers are urged together by said biasing member, said recesses in said sun rollers and said shaft will cooperate to encase said balls; whereby, as said shaft is rotated, said balls bear against walls of said sun roller recesses to urge said sun rollers apart against the bias of said biasing member.

34. The hub assembly of claim 33 including a cage fixed to said shaft and extending radially from said shaft between said first and second sun rollers; said cage including a plurality of recesses; said cage recesses and sun roller recesses being alignable with each other; said balls being received in said recesses of said cage and said sun rollers; whereby, as said shaft is rotated, said balls bear against walls of said sun roller recesses to urge said sun rollers apart against the bias of said biasing member.

35. The hub assembly of claim 31 wherein said camming mechanism includes a biasing member to urge said sun rollers together, a ring fixed to said central shaft; said ring having opposed side surfaces which extend from said shaft; at least one of said ring side surfaces being sloped to define a cam ramp, and a cam race on the first end of at least one of said sun rollers; whereby as said shaft rotates, said camming ramp rotates against the cam race of said at least one sun roller to urge said sun rollers apart against the force of said biasing member.

36. The hub assembly of claim 35 wherein said both side surfaces of said ring are sloped; said ring having a pair of sections of narrow width and a pair of sections of wide width; said sections of wide width being positioned between said sections of narrow width.

37. The hub assembly of claim 36 wherein said ramp and cam races are defined by a sweeping line that is generally perpendicular to the center shaft and which sweeps along a helical path.

* * * * *